US011196525B2

(12) United States Patent
Li et al.

(10) Patent No.: US 11,196,525 B2
(45) Date of Patent: Dec. 7, 2021

(54) NACK IN URLLC

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/385,505

(22) Filed: Apr. 16, 2019

(65) Prior Publication Data

US 2019/0327061 A1    Oct. 24, 2019

Related U.S. Application Data

(60) Provisional application No. 62/660,774, filed on Apr. 20, 2018.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04W 72/0466* (2013.01); *H04W 88/08* (2013.01)

(58) Field of Classification Search
CPC .............. H04L 5/0055; H04L 1/1812; H04W 72/0466; H04W 88/08
(Continued)

(56) References Cited

U.S. PATENT DOCUMENTS 6,816,478 B1    11/2004  Laroia et al.
8,412,222 B2    4/2013   Agrawal et al.
(Continued)

FOREIGN PATENT DOCUMENTS

EP         2045948 A2    4/2009

OTHER PUBLICATIONS

International Search Report and Written Opinion—PCT/US2019/027873—ISA/EPO—dated Jul. 29, 2019.
(Continued)

*Primary Examiner* — Chi Tang P Cheng
(74) *Attorney, Agent, or Firm* — QUALCOMM Incorporated

(57) ABSTRACT

A method, a computer-readable medium, and an apparatus are provided for wireless communication at a UE. The apparatus attempts to receive a downlink transmission from a base station and determines to transmit a NACK to the base station for the downlink transmission. The UE transmits the NACK to the base station in a common resource in an uplink control channel, wherein the common resource is common to multiple UEs communicating with the base station. The UE may also transmit the NACK using a resource granted to the UE in the uplink control channel. Thus, the transmission of the NACK in the common resource may comprise a repetition of the NACK transmitted using the resource granted to the UE. The common resource may comprise a Non-Orthogonal Multiple Access (NOMA) resource. Thus, the UE may apply a NOMA sequence to the NACK prior to transmission of the NACK in the common resource.

28 Claims, 14 Drawing Sheets

(51) Int. Cl.
*H04W 72/04* (2009.01)
*H04W 88/08* (2009.01)

(58) Field of Classification Search
USPC .......................................................... 370/335
See application file for complete search history.

(56) References Cited

U.S. PATENT DOCUMENTS

| | | | | |
|---|---|---|---|---|
| 2010/0124206 A1* | 5/2010 | Bottomley | ............. | H04B 1/707 370/336 |
| 2011/0044223 A1* | 2/2011 | Kim | ...................... | H04L 1/1887 370/312 |
| 2017/0164337 A1* | 6/2017 | Ryoo | .................... | H04L 5/1469 |
| 2019/0190753 A1* | 6/2019 | Bayesteh | ................ | H04L 27/36 |
| 2019/0261278 A1 | 8/2019 | Gupta et al. | | |

OTHER PUBLICATIONS

Kyocera: "Link adaptation for SC-PTM transmission", 3GPP Draft; R2-153408_SC-PTM_Link-Adaptation, 3rd Generation Partnership Project (3GPP), Mobile Competence Centre ; 650, Route Des Lucioles ;F-06921 Sophia-Antipolis Cedex ; France, vol. RAN WG2, No. Beijing, China;Aug. 24, 2015-Aug. 28, 2015, Aug. 23, 2015 (Aug. 23, 2015), XP051004129, 4 Pages, Retrieved from the Internet: URL:http://www.3gpp.org/ftp/Meetings_3GPP_SYNC/RAN2/Docs/ [retrieved on Aug. 23, 2015], figure 1, sections 2.1-2.2.

Motorola: "Control Signalling for Single-Cell MBMS Transmission", 3GPP Draft; R1-081283, 3rd Generation Partnership Project (3GPP), Mobile Competence Centre ; 650, Route Des Lucioles ; F-06921 Sophia-Antipolis Cedex; France, vol. RAN WG1, No. Shenzhen, China; Mar. 26, 2008, Mar. 26, 2008 (Mar. 26, 2008), XP050109721, 2 Pages, [retrieved on Mar. 26, 2008], section 3.

Samsung: "Procedures related consideration to NoMA", 3GPP Draft; R1-1804398, 3rd Generation Partnership Project (3GPP), Mobile Competence Centre ; 650, Route Des Lucioles; F-06921 Sophia-Antipolis Cedex ; France, vol. RAN WG1, No. Sanya, China; Apr. 16, 2018-Apr. 20, 2018, Apr. 15, 2018 (Apr. 15, 2018), XP051426683, 6 Pages, Retrieved from the Internet: URL:http://www.3gpp.org/ftp/Meetings%5F3GPP%5FSYNC/RAN1/Docs/ [retrieved on Apr. 15, 2018], sections 3.1-3.2, sections 2.1-2.5.

\* cited by examiner

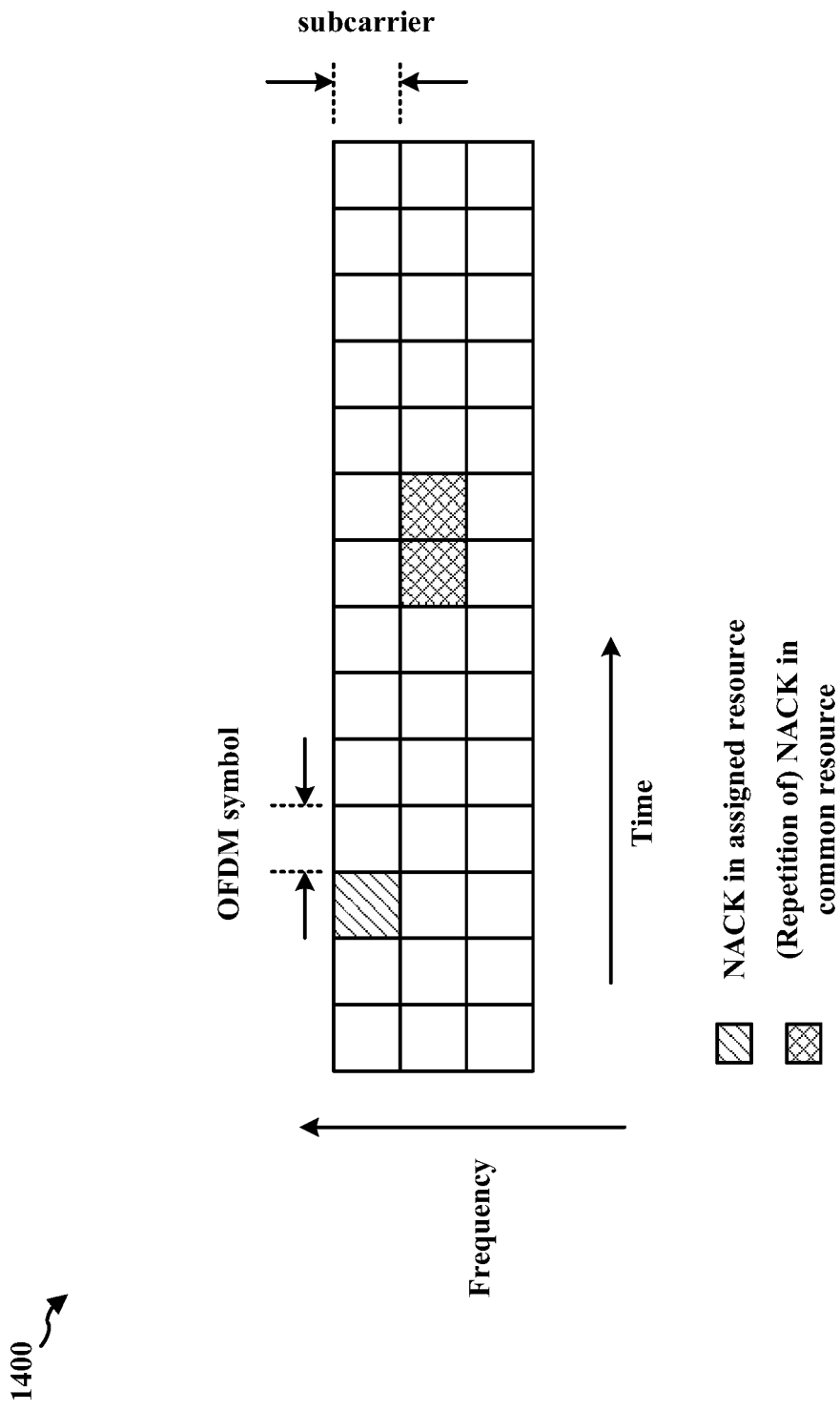

NACK IN URLLC

CROSS REFERENCE TO RELATED APPLICATION(S)

This application claims the benefit of U.S. Provisional Application Ser. No. 62/660,774, entitled "NACK IN URLLC" and filed on Apr. 20, 2018, which is expressly incorporated by reference herein in its entirety.

BACKGROUND

Technical Field

The present disclosure relates generally to communication systems, and more particularly, to NACK signaling from a User Equipment (UE) to a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. Certain types of communication, such as Ultra-Reliable and Low-Latency Communications (URLLC), may have a very low Packet Error Rate (PER) with low latency requirements. Improvements in the accuracy and efficiency of such communication are needed. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain types of communication, such as URLLC, may have a very low Packet Error Rate (PER) requirement along with a low latency requirement. The hybrid automatic repeat request (ARQ) (HARQ) procedure may be important to meeting such requirements and to the efficient use of wireless resources. The present application provides a way to improve the reliability of HARQ communication.

In an aspect of the disclosure, a method, a computer-readable medium, and an apparatus are provided for wireless communication at a UE. The apparatus attempts to receive a downlink transmission from a base station and determines to transmit a NACK to the base station for the downlink transmission, e.g., when the UE fails to decode the downlink transmission. The UE transmits the NACK to the base station in a common resource in an uplink control channel, wherein the common resource is common to multiple UEs communicating with the base station. The UE may also transmit the NACK using a resource granted to the UE in the uplink control channel. Thus, the transmission of the NACK in the common resource may comprise a repetition of the NACK transmitted using the resource granted to the UE. The common resource may comprise a Non-Orthogonal Multiple Access (NOMA) resource. Thus, the UE may apply a NOMA sequence to the NACK prior to transmission of the NACK in the common resource.

In another aspect of the disclosure, a method, a computer-readable medium, and an apparatus are provided for wireless communication at a base station. The apparatus transmits a downlink transmission to a UE and receives a NACK from the UE in a common resource in an uplink control channel, wherein the common resource is common to multiple UEs communicating with the base station. The common resource may comprise a NOMA resource. Thus, the NACK may comprise a NOMA sequence applied to the NACK prior to transmission in the common resource. The base station may assign NOMA sequences to a plurality of UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14 is a an example of resources used for NACK.

DETAILED DESCRIPTION

Figure 1:
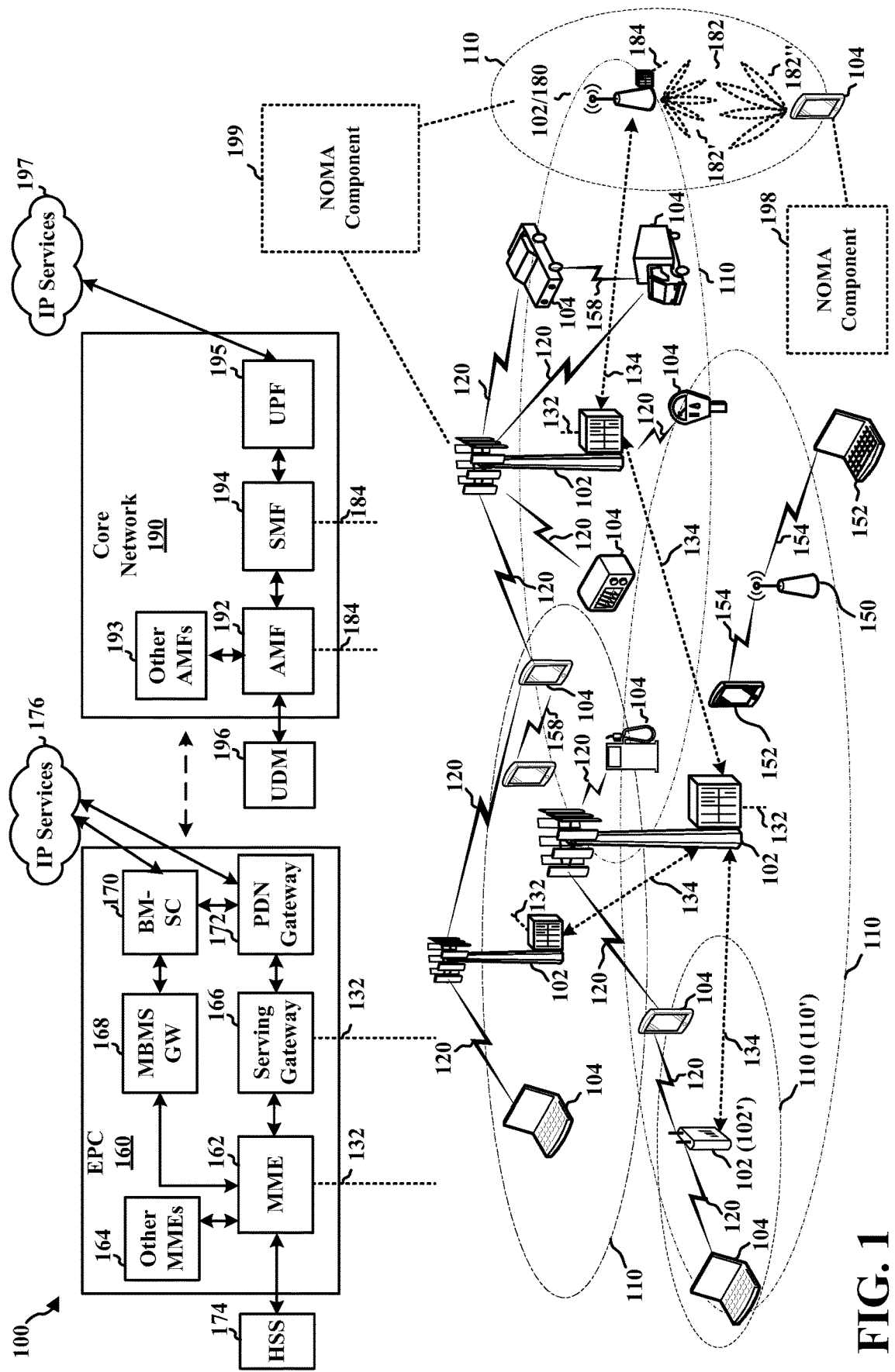
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5D Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5D NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a NOMA component 198 configured to transmit/retransmit a NACK in a NOMA common resource as described herein. In certain aspects, the base station 102, 180 may comprise a NOMA component 199 configured to receive NACKs from UEs in a NOMA common resource as described herein. The base station 102, 180 may also be configured to assign NOMA sequences to the UE(s) that identify the UE that transmitted the NACK in the common resource. Although the following description may be focused on 5D NR, the concepts described herein may be applicable to other similar areas, such as LTE, LTE-A, CDMA, GSM, and other wireless technologies.

Figure 2:
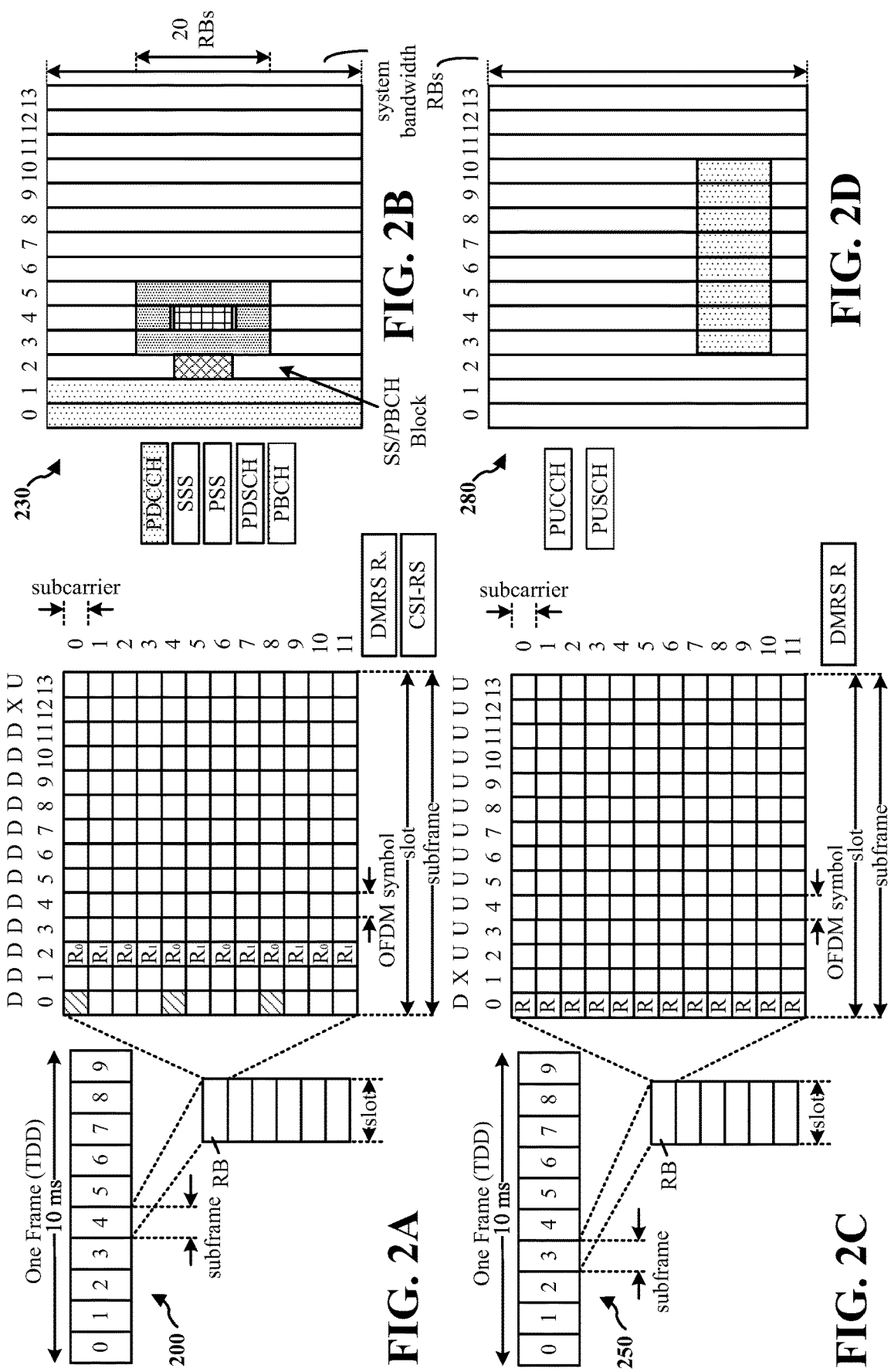
FIGS. 2A, 2B, 2C, and 2D are diagrams illustrating examples of a first 5D/NR frame, DL channels within a 5D/NR subframe, a second 5D/NR frame, and UL channels within a 5D/NR subframe, respectively.

FIG. 2A is a diagram 200 illustrating an example of a first subframe within a 5G/NR frame structure. FIG. 2B is a diagram 230 illustrating an example of DL channels within a 5D/NR subframe. FIG. 2C is a diagram 250 illustrating an example of a second subframe within a 5D/NR frame structure. FIG. 2D is a diagram 280 illustrating an example of UL channels within a 5D/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5D/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5D/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
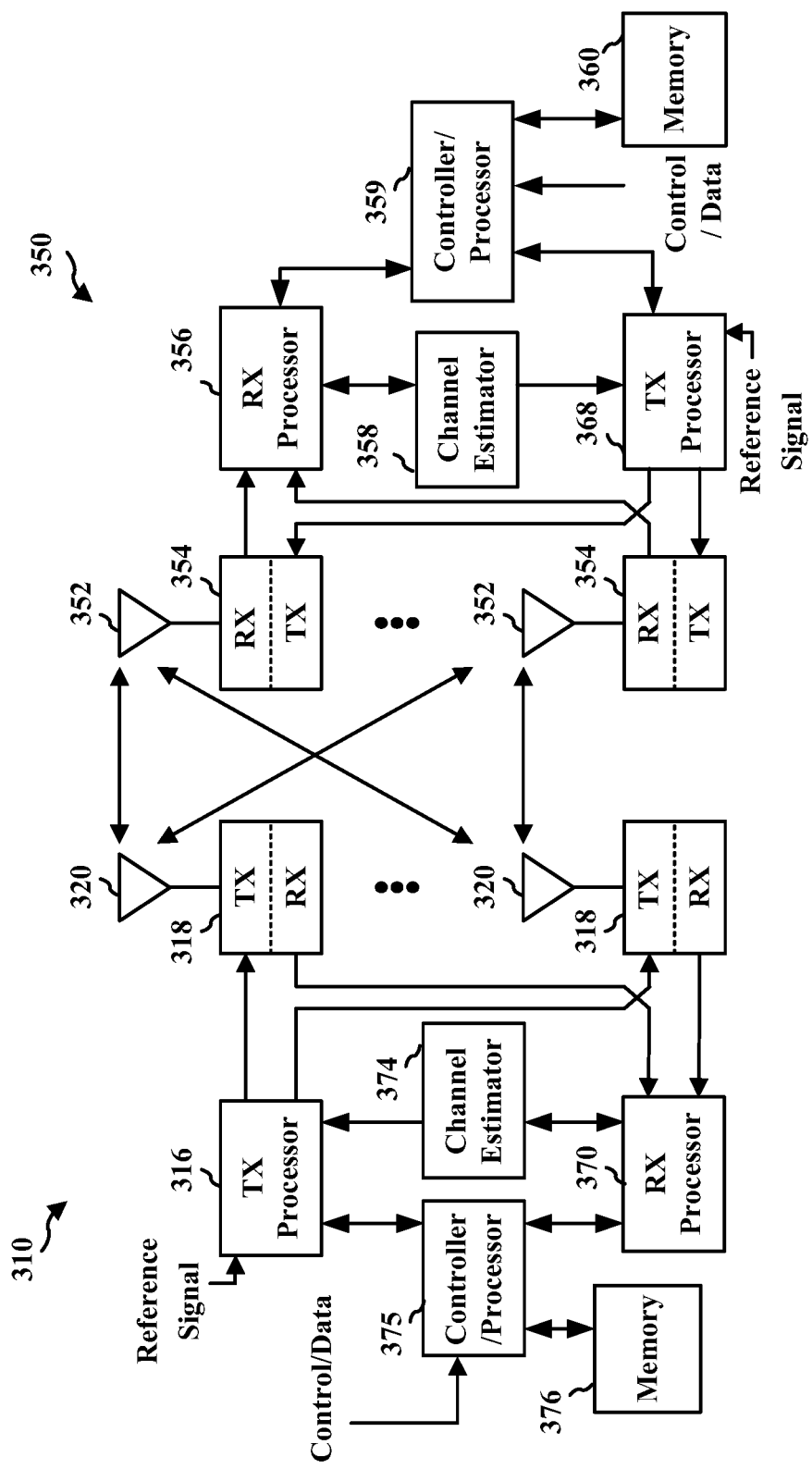
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
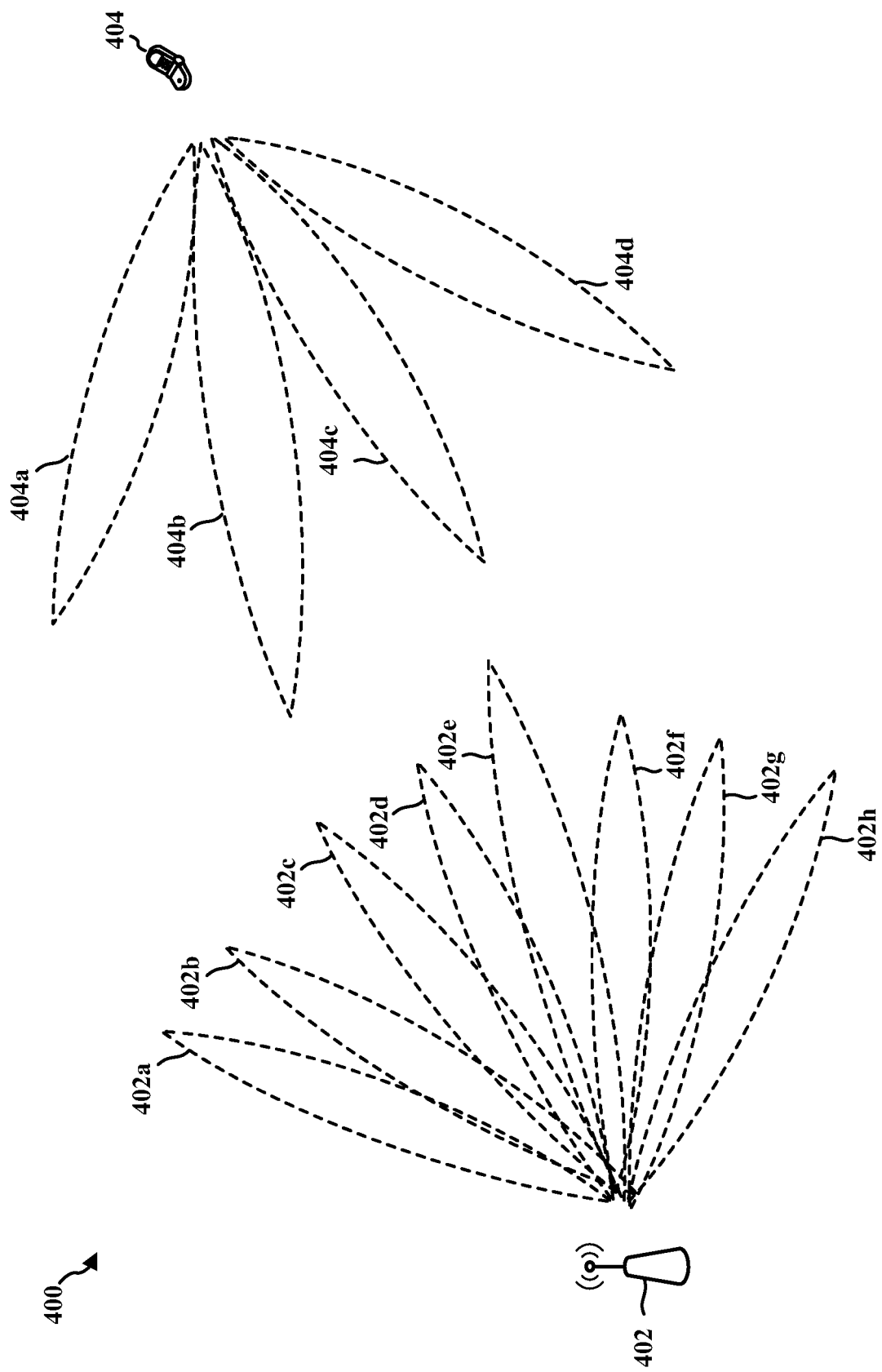
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Certain types of communication, may have a very low Packet Error Rate (PER) requirement and may also have a low latency requirement. Latency may correspond to an amount of time required for transmitting a message through the network. As one example, URLLC may comprise a new service category in 5D/NR to accommodate emerging services and applications having stringent latency and reliability requirements. URLLC may require a PER on the order of $10^{-5}$, $10^{-6}$, or even lower. The latency requirements for URLLC may similarly be low, e.g., around 1-5 ms. A number of potential applications, e.g., wireless automation of production facilities, vehicular traffic, medical, remote control (e.g. remote robotics, surgery, tactile internet etc.), safety, mobile gaming, etc. may require very reliable communication with a very low latency.

The hybrid automatic repeat request (ARQ) (HARQ) procedure may be important to meeting such PER and latency requirements. The HARQ procedure may also be important the efficient use of wireless resources. The present application improves HARQ reliability, which in turn reduces packet loss. The improved HARQ reliability is achieved in an efficient manner that avoids wasting wireless resources. Thus, the solution provided in the present application enhances user service quality by reducing packet loss while maintaining effective utilization of resources.

When data is transmitted to a receiver, the receiver attempts to receive and decode the data transmission. If the receiver successfully decodes the data transmission, the receiver transmits an ACK to the transmitter as part of the HAARQ procedure. If the receiver does not successfully decode the data transmission, the receiver transmits a NACK to the transmitter to inform the transmitter of the error in receiving the data transmission. Upon receiving the NACK, the transmitter may respond by retransmitting the data transmission to the receiver. For downlink data transmitted from a base station to the UE (e.g., PDSCH), the ACK/NACK may be transmitted from the UE to the base station in an uplink control channel (e.g., PUCCH) as UCI. For uplink data transmitted from a UE to the base station (e.g., PUSCH), the ACK/NACK may be transmitted from the base station to the UE in an downlink control channel (e.g., PDCCH) as DCI.

If a HARQ NACK is not received and/or decoded correctly by the transmitter, then the data may not retransmitted by the transmitter. This failure to retransmit data that the UE failed to decode leads to packet loss. If the NACK is not received, the transmitter may not retransmit the data. If the NACK is mistaken for an ACK, the transmitter will not retransmit the data.

If an ACK is mistakenly interpreted by the transmitter to be a NACK, the transmitter will retransmit the data even though the data was decoded by the UE. While the transmission is redundant, because the receiver has already properly received and decoded the data, the retransmission does not lead to packet loss. In contrast, if a transmitter mistakes a NACK to be an ACK, there will not be a retransmission of the data that the receiver has failed to decode. This failure to retransmit the data causes a packet loss and increased PER for the UE. The failure to retransmit the data for the UE may also lead to an undesirable increase in latency, e.g., due to an RLC recovery. Aspects presented herein improve NACK reliability, e.g., to achieve the low PER for URLLC.

Each UE may have dedicated resources assigned and/or granted to the UE for ACK/NACK on PUCCH. While NACK reliability could be improved by assigning additional ACK/NACK UCI resources to each UE, such assignments would place a burden on the system. Wireless resources may be scarce, and it is important to improve the efficiency with which such resources are used.

An error probability of UCI NACK-to-ACK events may be reduced, while at the same time maintaining the efficient use of time and frequency resources, through the use of a common resource pool that is reserved for NACKs from any UEs communicating with a base station. Thus, in addition to the use of dedicated resources for a UE-specific ACK/NACK transmission, an additional, common resource may be designated for NACK transmissions. The NACKs may be transmitted in the common resource in a NOMA manner.

Figure 5:
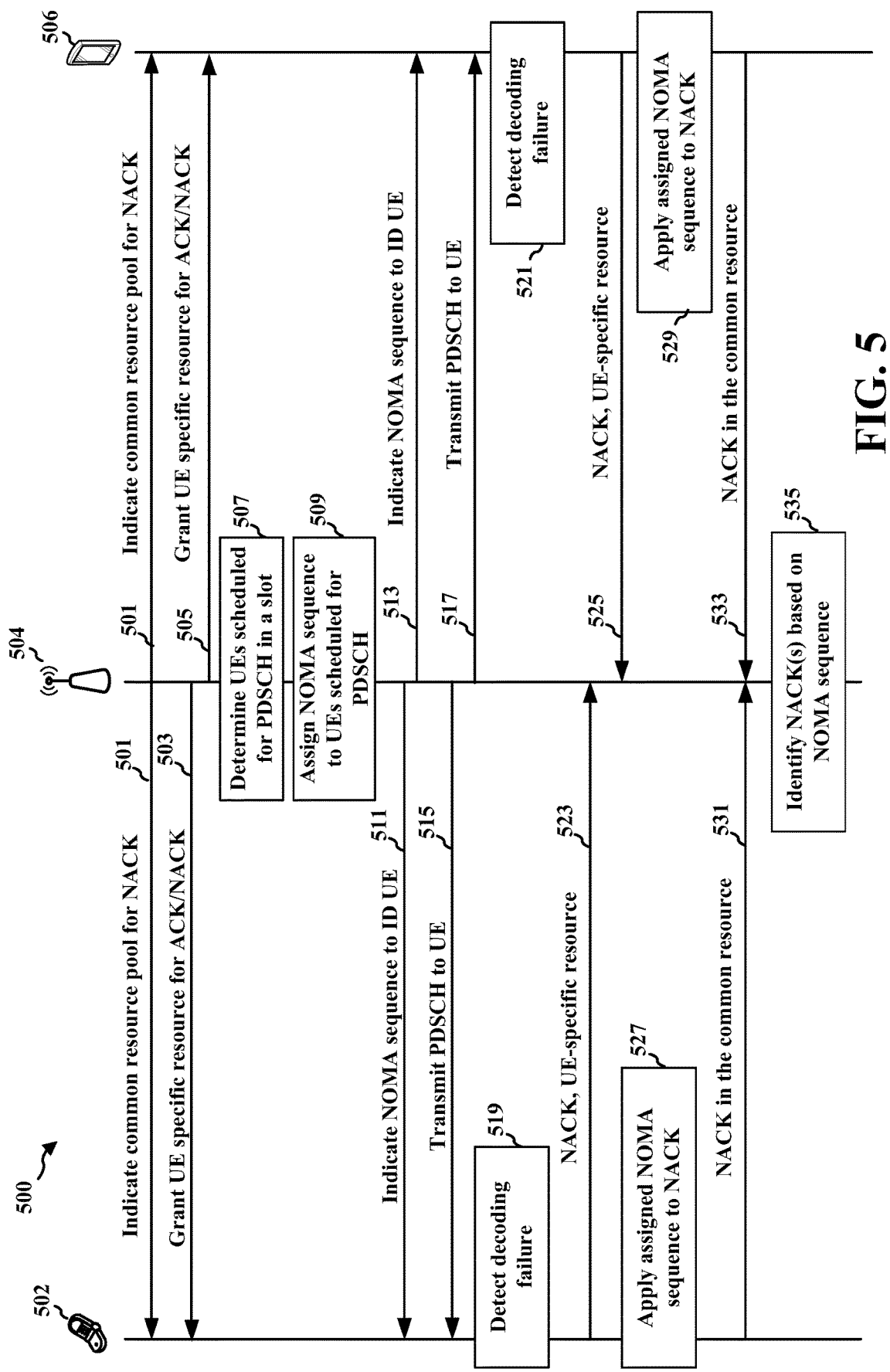
FIG. 5 is an example of communication between a UE and a base station.

FIG. 5 illustrates an example of communication 500 between a base station 504 and UEs 502, 506. The system may comprise a TDD system, e.g., comprising URLLC. Although only two UEs are illustrated, the base station 504 may be in communication with any number of UEs. The base station 504 may correspond to base station 102, 180, 310, 402, 604, 950, the apparatus 1202, 1202'. The UEs 502, 506 may correspond to UE 104, 350, 404, 602, 606, 1250, the apparatus 902, 902'.

The base station 504 may transmit an indication 501 of a common resource pool designated for NACK(s) from UEs in communication with the base station. The common resources reserved for NACK may be semi-statically configured, and may be indicated to the UEs, e.g., via RRC signaling.

At 503, the base station may grant a first set of resources (in time and frequency) to UE 502 for transmission of ACK/NACK. At 504, the base station may grant a second set of resources (in time and frequency) to UE 506 for transmission of ACK/NACK. The first set of resources and the second set of resources may be different, so that each UE has a UE-specific set of resources for the transmission of a UE-specific ACK/NACK. Thus, when the base station receives an ACK/NACK on the first set of resources, the base station may determine that the ACK/NACK is from UE 502 because the first set of resources were assigned to UE 502. Likewise, if the base station receives an ACK/NACK on the second set of resources, the base station may determine the source of the ACK/NACK based on the resources used by UE 506 to transmit the ACK/NACK.

At 507, the base station may determine which UEs are scheduled to receive a downlink data transmission, e.g., PDSCH, in a slot. The aspects taught herein may also be applied to other periods of time, e.g., to a group of slots, etc. Based on the identification, at 507, of the UEs scheduled for data, the base station may assign a NOMA sequence to each of the UE's scheduled to receive a downlink data transmission in the slot, at 509. The NOMA sequences may comprise a scrambling sequence and/or a hopping sequence that may be used to identify a UE transmitted a NACK to the base station in the common resource.

At 511, the base station indicates a first NOMA sequence to UE 502 that will enable the base station to identify a NACK from UE 502 in the common NACK resource. At 513, the base station indicates a second NOMA sequence to UE 506 that will similarly enable the base station to identify a NACK from UE 506 in the common NACK resource. The NOMA signaling at 511, 513 may be sent to the UEs in a downlink control channel, e.g., PDCCH. While indications 511, 513 are illustrated as being sent to UEs 502, 506 independently and occurring at different times, the indications may also occur concurrently and/or be comprised in the same signaling.

Then, at 515, the base station transmits the downlink data transmission, e.g., PDSCH, to UE 502. At 517, the base station similarly transmits a downlink data transmission to UE 506. While data transmissions 515, 517 are illustrated as being transmitted at different times, the transmissions may also occur concurrently.

Each UE 502, 506 will attempt to receive and decode the downlink data transmitted to it from the base station. If a decoding error is detected, e.g., as illustrated at 519 and 521, respectively, the UEs 502, 506 determine to transmit a NACK to the base station to inform the base station that the data transmission was not properly received. The UEs may each transmit a UE-specific NACK using the ACK/NACK resources granted to the corresponding UE at 503, 505. Thus, UE 502 transmits a NACK 523 using the resources granted to the UE 502 at 503. Similarly, UE 506 transmits a NACK 525 using the resources granted to the UE 506 at 505. The resources used to transmit NACK 523 differ from the resources used to transmit NACK 525 in at least one of time and frequency.

The NACK 523, 525 might not be received by the base station 504 or might be interpreted by the base station 504 as an ACK. Thus, in order to improve the reliability of NACK transmission, at 531, 533, the UEs 502, 506 may retransmit the NACKs in the common NACK resource (in frequency and time) indicated to the UEs at 501. This common NACK resource may comprise an uplink control channel, e.g., PUCCH, resource designated for UEs to repeat their NACKs. As the resource is common to UEs 502, 506, the base station will not be able to determine the source of the NACKs 531, 533 merely by the resources used to transmit the NACK. Thus, the UEs may apply a unique sequence to the NACK before transmission at 531, 533 that enables the base station to determine the source of the NACK. For example, at 527, 529, the UEs may apply a NOMA sequence to their respective NACKs before transmitting the NACKs on the common resource at 531, 533. The NOMA sequence enables the base station to distinguish between two NACKs received in the common NACK resource at the same time and/or the same frequency. The NOMA sequence may comprise a scrambling sequence, e.g., in Resource Spread Multiple Access (RSMA) Thus, the NACKs transmitted at 531, 533 may each be scrambled with a UE-specific scrambling sequence that identifies the transmitting UE. In another example, the NOMA sequence may comprise a hopping sequence, e.g., in Sparse code multiple access (SCMA). Thus, the NACKs transmitted at 531, 533 may each be modified with a UE-specific hopping sequence that identifies the transmitting UE. The NOMA sequences applied to the NACKs 527, 529 may be based on the NOMA sequences indicated to the respective UEs at 511, 513.

Thus, at 535, the base station identifies the respective UEs 502, 506 that were the source of NACKs 531, 533 in the common resource based on the NOMA sequence applied to the respective NACKs. Thus, even when the NACKs 531, 533 are received at the same time and on the same frequency, the base station may individually identify the source of the NACKs.

The use of a common resource pool designated for NACKs from multiple UEs communicating with the base station, enables any UEs with a decoding failure to improve their HARQ reliability by retransmitting a NACK on the common resource. The use of the common resource pool for the NACK retransmissions avoids an inefficient use of resources that could be incurred by assigning additional UE specific resources for a retransmission of ACK/NACK. Furthermore, the use of NOMA sequences enables the base station to identify a source of any NACKs received in the common resource. The improved NACK reliability will lead the base station to retransmit the downlink data in a more timely manner. This will improve PER and reduce latency.

Figure 6:
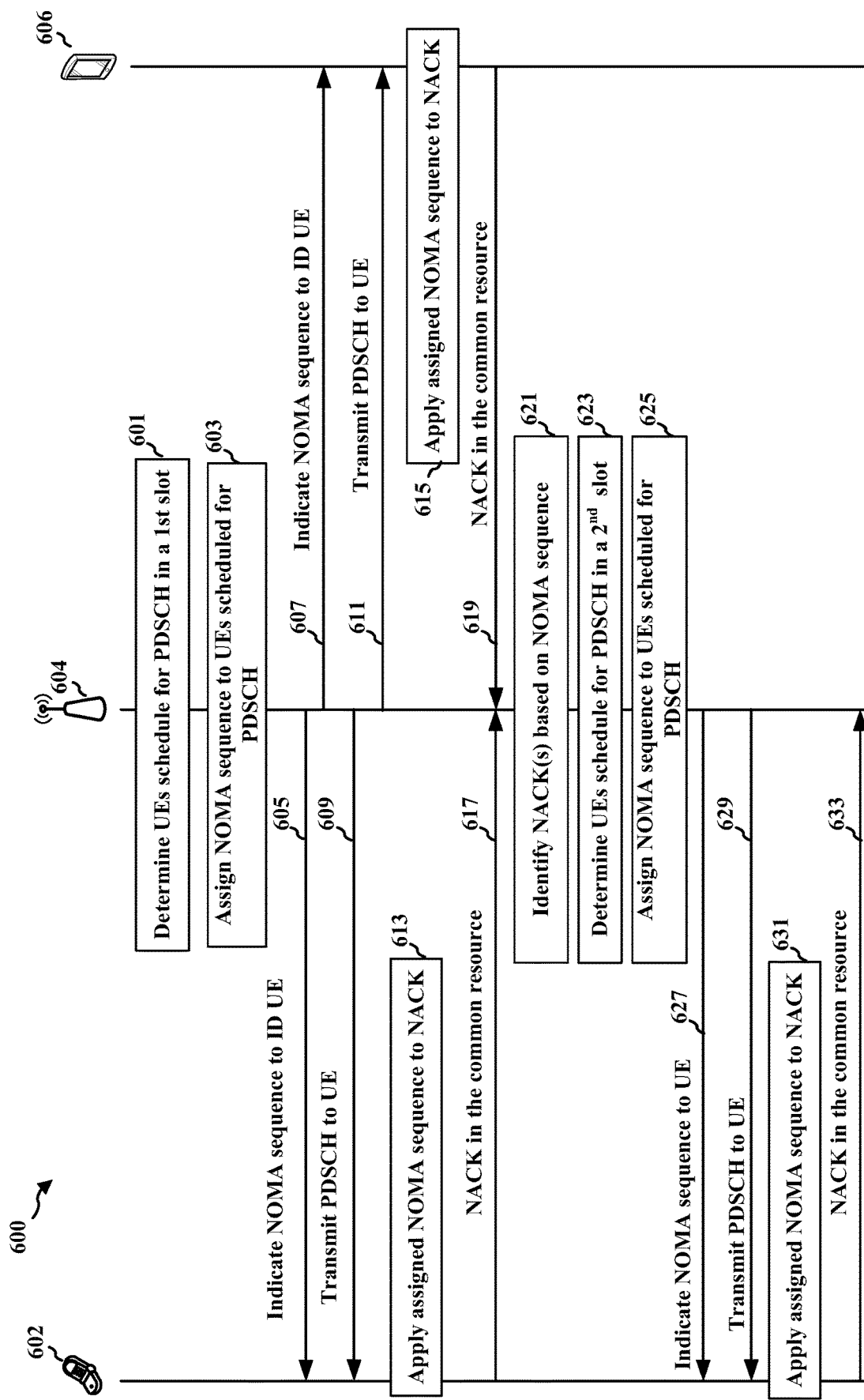
FIG. 6 is an example of communication between a UE and a base station.

FIG. 6 illustrates an example of communication 600 between a base station 604 and UEs 602, 606. The base station may correspond to base station 504, and the UEs may correspond to UEs 602, 606. FIG. 6 illustrates an example in which the NOMA sequences may be dynamically assigned to UEs. Although details described in connection with FIG. 5 are not illustrated, these additional aspects may be incorporated into the communication in FIG. 6.

In the example illustrated in FIG. 6, the base station may dynamically assign NOMA sequences to UEs based on UE that are scheduled to receive data in a particular slot (or other period of time). For example, PDSCH may be scheduled for UEs on a slot-by-slot basis. At 601, the base station determines which UEs are scheduled to receive data in a first slot. At 603, the base station assigns a unique NOMA sequence to each UE scheduled to receive data in the first slot. For example, the base station may determine that UE 602 and UE 606 are both scheduled to receive data in the first slot. At 605, the base station may indicate a first, assigned NOMA sequence to UE 602, e.g., via PDCCH. At 607, the base station may indicate a second, assigned NOMA sequence to UE 606, e.g., via PDCCH. The base station may then transmit the PDSCH 609 to UE 602 and transmit PDSCH 611 to UE 606. If the UEs determine a decoding failure has occurred in receiving transmissions 609, 611, the UEs transmit a NACK 617, 619 using the common NACK resource. As described in connection with the example of FIG. 5, the NACK 617, 619 may be a retransmission of a NACK sent on UE-specific ACK/NACK resources. Prior to transmitting the NACK 617, UE 602 applies the first assigned NOMA sequence to the NACK at 617. The first NOMA sequence used by the UE at 617 is based on the first NOMA sequence assigned to UE with indication 605. Similarly, prior to transmitting the NACK 619, UE 606 applies the second, assigned NOMA sequence to the NACK at 619. The second NOMA sequence used by the UE at 619 is based on the second NOMA sequence assigned to UE 606 with indication 607.

At 621, the base station 604 identifies the respective UEs 602, 606 that were the source of NACKs 617, 619 in the common resource based on the first/second NOMA sequence applied to the respective NACKs.

For a second slot, the base station may repeat the identification of UEs scheduled for PDSCH and the assignment of NOMA sequences. For example, at 623, the base station determines which UEs are scheduled to receive data in a second slot. In the second slot, UE 602 (as well as additional UEs) might be scheduled to receive PDSCH, whereas UE 606 is not scheduled to receive PDSCH. At 625, the base station assigns a unique NOMA sequence to UE 602 because UE 602 is scheduled to receive data in the second slot and may need to transmit a NACK. At 627, the base station may indicate a third, assigned NOMA sequence to UE 602, e.g., via PDCCH. The third NOMA sequence may be the same as the first NOMA sequence assigned to UE 602 at 605. The third NOMA sequence may be different than both the first NOMA sequence previously assigned to UE 602 for the first slot and the second NOMA sequence previously assigned to UE 606 for the first slot. The base station may reuse/reassign NOMA sequences between slots. Thus, the third NOMA sequence assigned to UE 602 for the second slot may correspond to the second NOMA sequence assigned to UE 606 for the first slot. Also, although only two UEs are illustrated in FIG. 6, the base station may be in communication with any number of UEs. Thus, the base station may also assign NOMA sequences to additional UEs beyond UE 602 for the second slot.

At 629, the base station transmits the PDSCH to UE 602. If UE 602 detects a decoding failure, the UE applies the third, assigned NOMA sequence to the NACK at 631 and transmits the NACK to the base station in the common resource at 633. The base station would receive the NOMA NACK and identify UE 602 based on the NOMA sequence used in connection with the NACK. This would continue for each of the following slots, with the base station identifying the UEs scheduled to receive data and assigning a NOMA sequence to the scheduled UEs for use in transmitting a NACK in the common resource during the slot. Once the slot has finished, the NOMA sequence might no longer apply to the UE.

Figure 7:
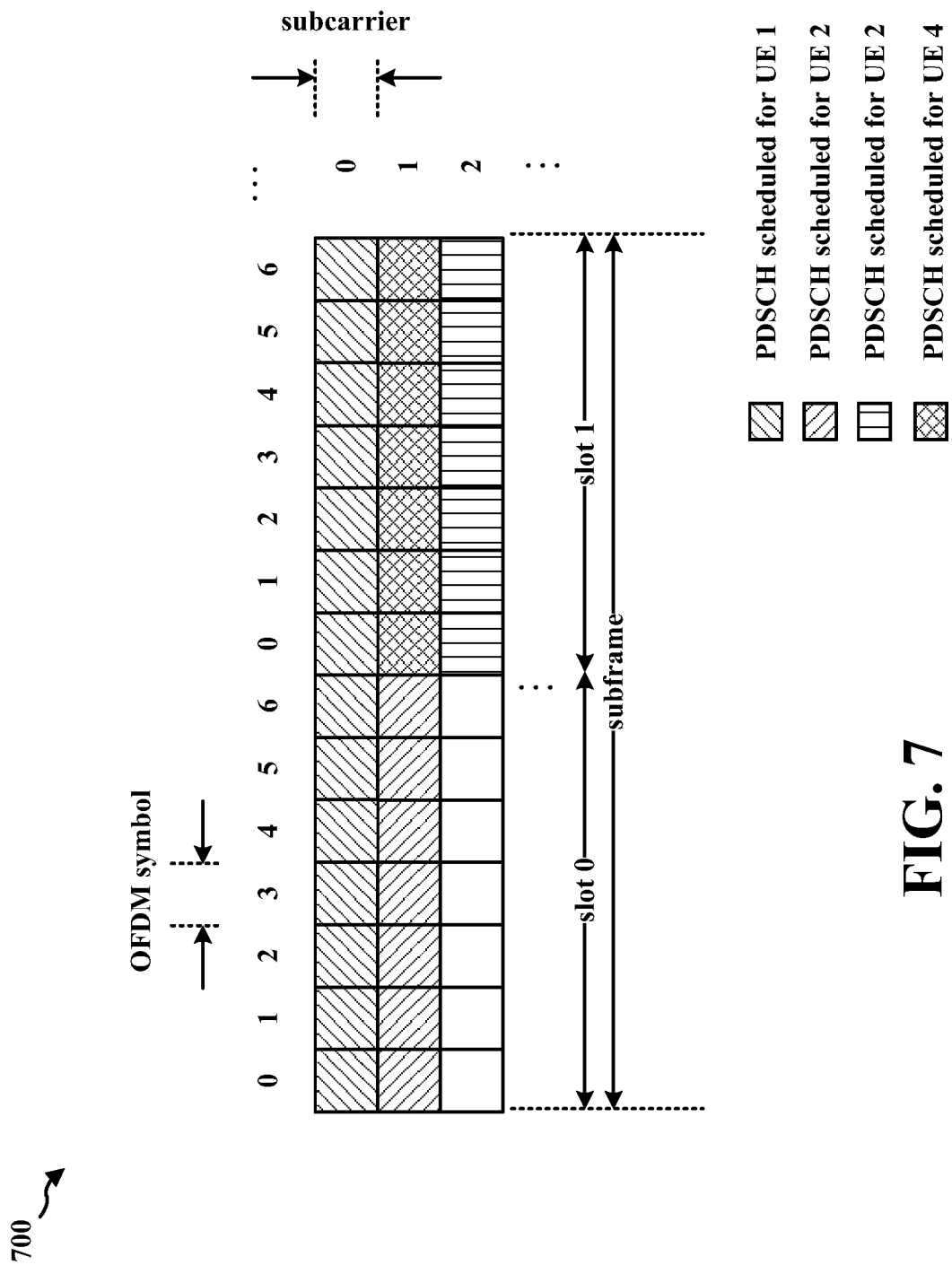
FIG. 7 is an example of PDSCH scheduled for different UEs in various slots.

FIG. 7 illustrates an example 700 of two slots (slot 0, slot 1) having different UEs scheduled for PDSCH. In slot 0, UE 1 and UE2 are scheduled to receive PDSCH. Thus, the base station may assign both UE 1 and UE 2 a NOMA sequence (e.g., scrambling sequence and/or frequency hopping sequence) for use in transmitting/retransmitting a NACK in a common NACK resource during slot 0. In slot 1, UE 1 is again scheduled to receive PDSCH, while UE 2 is not scheduled to receive PDSCH. Additionally, UE 3 and UE 4 are scheduled to receive PDSCH in slot 1. Thus, the base station may assign UE 1, UE 2, and UE 3 a unique NOMA sequence (e.g., scrambling sequence and/or frequency hopping sequence) for use in transmitting/retransmitting a NACK in a common NACK resource during slot 1. The base station may reuse the NOMA sequence assigned to UE 2 or UE 1 in slot 0 and assign that same NOMA sequence to UE 1, UE 3, or UE 4 for use during slot 1. In another example, the base station may assign reuse the NOMA sequence assigned to UE 1 in slot 0 to be used by UE 1 in slot 1 and may assign two new NOMA sequences to UE 3 and UE 4 for slot 1. In yet another example, the base station may assign three different NOMA sequences in slot 1 for UE 1, UE 3, and UE 4, the three NOMA sequences being different than the two NOMA sequences assigned in slot 0.

While the example aspects have been described in connection with downlink data and a NACK transmitted over the uplink, the aspects may similarly be applied in the opposite direction, e.g., for an uplink data transmission. The aspects may be especially helpful for a NACK from a UE, as a UE has limited power and limited resources, whereas a base station may take alternative approaches for NACK signaling, such as boosting transmission power or assigning additional resources.

Figure 8:
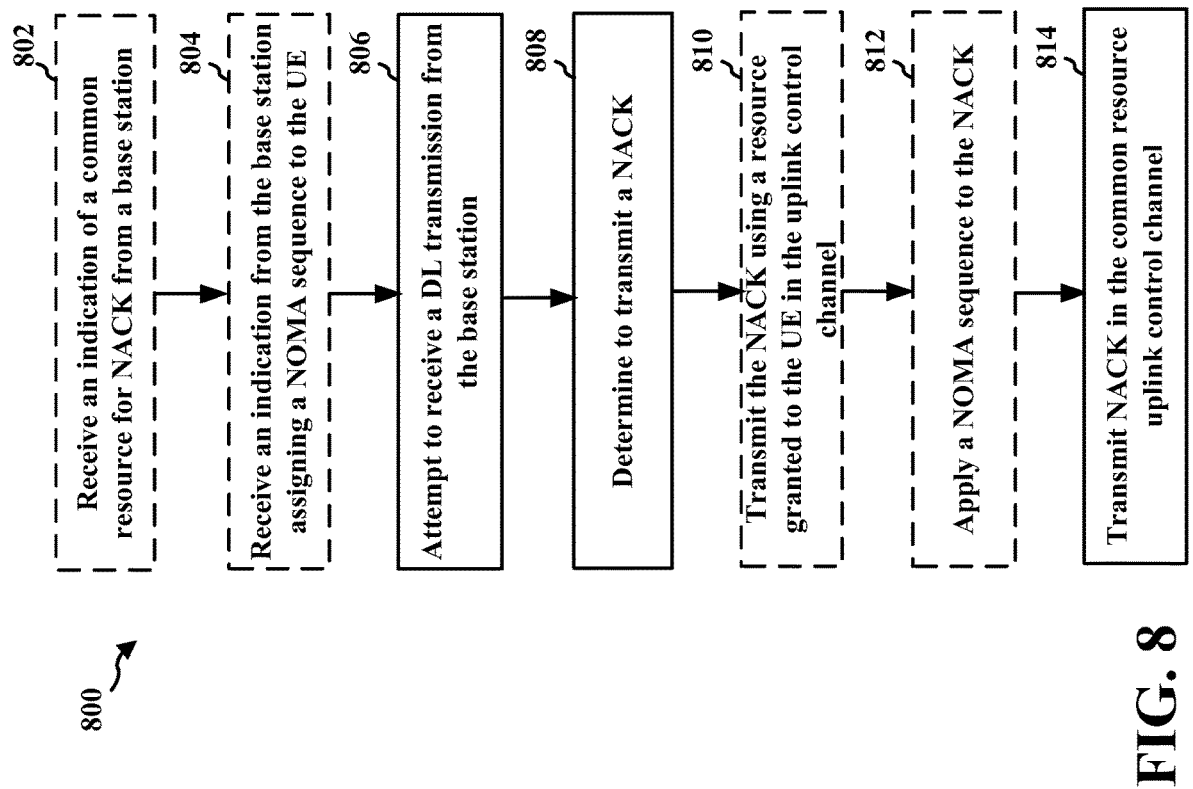
FIG. 8 is a flowchart of a method of wireless communication.

FIG. 8 is a flowchart 800 of a method of wireless communication. The method may be performed by a UE (e.g., UE 104, 350, 404, 502, 506, 602, 606, 1250, the apparatus 902, 902' the processing system 1014, which may include the memory 360 and which may be the entire UE 350 or a component of the UE 350, such as the TX processor 368, the RX processor 356, and/or the controller/processor 359) communicating with a base station (e.g., base station 102, 180, 310, 402, 504, 604, 950, the apparatus 1202, 1202'). The communication may comprise TDD communication. The communication may comprise URLLC communication. Optional aspects are illustrated with a dashed line. Aspects of the method may improve decoding of HARQ NACK. Thus, aspects of the method may help data to be retransmitted in a more timely manner or help to avoid wasting resources by reducing unnecessary retransmission of data packets that have been decoded correctly.

At 806, the UE attempts to receive a downlink transmission from the base station. The attempt may be performed, e.g., by reception component 904 of apparatus 902. The downlink transmission may comprise downlink data, e.g., PDSCH 515, 517. The attempt to receive the downlink transmission may include attempting to decode the downlink transmission.

At 808, the UE determines to transmit a NACK to the base station for the downlink transmission. The determination may be performed, e.g., by NACK component 908 of apparatus 902. For example, the UE may determine to transmit the NACK when the UE fails to decode the downlink transmission, e.g., similar to the determination described for 519, 521.

At 814, the UE transmits the NACK to the base station in a common resource in an uplink control channel, wherein the common resource is common to multiple UEs communicating with the base station. For example, common resource component 910 of apparatus 902 may transmit the NACK in the common resource, e.g., via transmission component 906. The uplink control channel may comprise PUCCH. The base station may inform the UE of the common resource, as described in connection with 501 in FIG. 5. Thus, at 802, the UE may receive an indication of the common resource from the base station prior to transmitting the NACK. For example, resource component 918 of apparatus 902 may receive the indication of the common resource and provide the common resource information to the common resource component 910. The indication may be received, e.g., via an RRC message from the base station.

As illustrated at 810, the UE may first transmit the NACK using a resource granted to the UE in the uplink control channel prior to transmitting the NACK in the common resource, as illustrated at 523 in FIG. 5. For example, granted resources component 912 of apparatus 902 may transmit the NACK using a resource granted to the UE. Thus, the transmission of the NACK in the common resource may comprise a repetition of the NACK transmitted using the resource granted to the UE, e.g., a dedicated resource for UE-specific ACK/NACK transmission. FIG. 14 illustrates an example 1400 showing a NACK transmitted in common resources in time and frequency. FIG. 14 also illustrates that a first NACK may be transmitted using assigned resource in time and frequency and the NACK(s) transmitted in the common resource may comprise repetition(s) of the NACK in the assigned resource. Although FIG. 14 illustrates the example using symbols and subcarriers, the concept may be applied to assigned resources and common resources of different sizes than a symbol and a subcarrier.

The common resource may comprise a NOMA resource in which multiple UEs may transmit a NACK/NACK repetition in a NOMA manner. Thus, at 812, the UE may apply a NOMA sequence to the NACK prior to transmission in the common resource at 812. For example, the NOMA sequence may be applied by NOMA component 914 of apparatus 902. The NOMA sequence applied to the NACK identifies the UE, e.g., scrambles the NACK with a UE specific ID. In one example, the NOMA sequence may comprise a scrambling sequence. In another example, the NOMA sequence may comprise a frequency hopping sequence.

At 804, the UE may receive an indication from the base station assigning the NOMA sequence to the UE. The indication may be received, e.g., by NOMA sequence component 916 of apparatus 902 and may be provided to NOMA component 914. The indication may comprise a dynamic indication that assigns the NOMA sequence to the UE for a period of time. The dynamic indication may be provided to the UE, e.g., via PDCCH. The period of time may correspond to a duration of a slot in which the indication is received, as described in connection with FIGS. 6 and 7. In other examples, the period of time may be different than a single slot. As an example, the NOMA signaling may be carried in PDCCH that includes NOMA scrambled ID assignments for the scheduled UEs in the current slot. If there are two UE scheduled for PDSCH, then two NOMA sequences may be assigned to the UEs for NOMA NACKs. In a different slot, there may be a different UEs scheduled for PDSCH. Thus, the base station may assign NOMA sequences for the different UEs. The base station may reuse the NOMA sequences, assigning them to whichever UEs are scheduled for PDSCH in the current slot.

Thus, the UE may transmit a NACK/repetition of a NACK using a common resource comprises a NOMA resource dedicated for NACKs from multiple UEs in communication with the base station.

Figure 9:
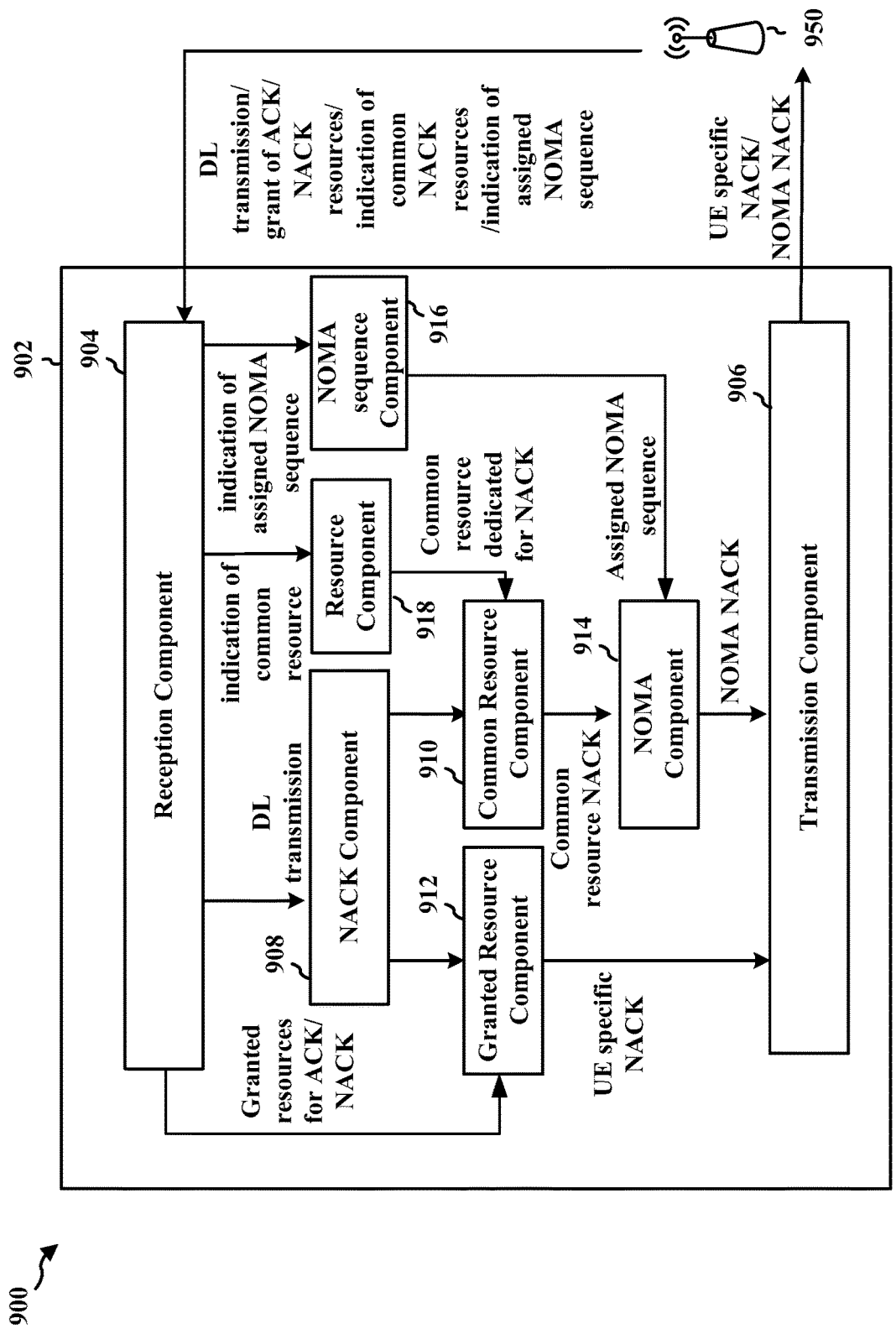
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE (e.g., UE 104, 350, 404, 502, 506, 602, 606, 1250) configured for communication with a base station 950 (e.g., base station 102, 180, 310, 402, 504, 604, the apparatus 1202, 1202'). The communication may comprise TDD communication, e.g., URLLC communication. The apparatus includes a reception component 904 that receives downlink communication from the base station, a transmission component 906 that transmits uplink communication, including ACK/NACKs, to the base station. The reception component 904 is configured to attempt to receive a downlink transmission from the base station 950 (e.g., as described in connection with 806). The apparatus includes a NACK component 908 configured to determine to transmit a NACK to the base station for the downlink transmission, e.g., based on the UE failing to decode a data transmission from the base station (e.g., as described in connection with 808). The apparatus comprises a common resource component 910 configured to transmit the NACK to the base station in a common resource in an uplink control channel (e.g., as described in connection with 814). The apparatus may also comprise a granted resource component 912 configured to transmit the NACK using a resource granted to the UE in the uplink control channel (e.g., as described in connection with 810). The apparatus may also comprise a NOMA component 914 configured to apply a NOMA sequence identifying the UE to the NACK prior to transmission in the common resource (e.g., as described in connection with 812). The apparatus may comprise a NOMA sequence component 916 configured to receive an indication from the base station assigning the NOMA sequence to the UE (e.g., as described in connection with 804). The NOMA applied to the NACK by the NOMA component may be based on the NOMA assigned to the UE, as determined by the NOMA sequence component 916. The apparatus may comprise a resource component 918 configured to receive an indication of the common resource from the base station prior to transmitting the NACK (e.g., as described in connection with 802). Thus, the common resource used by the common resource component 910 to transmit the NACK may be based on the resource determined by the resource component 918 based on the indication from the base station.

The apparatus may include additional components that perform each of the blocks of the algorithm for a UE in the aforementioned flowcharts of FIGS. 5, 6, and 8. As such, each block in the aforementioned flowcharts of FIGS. 5, 6, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
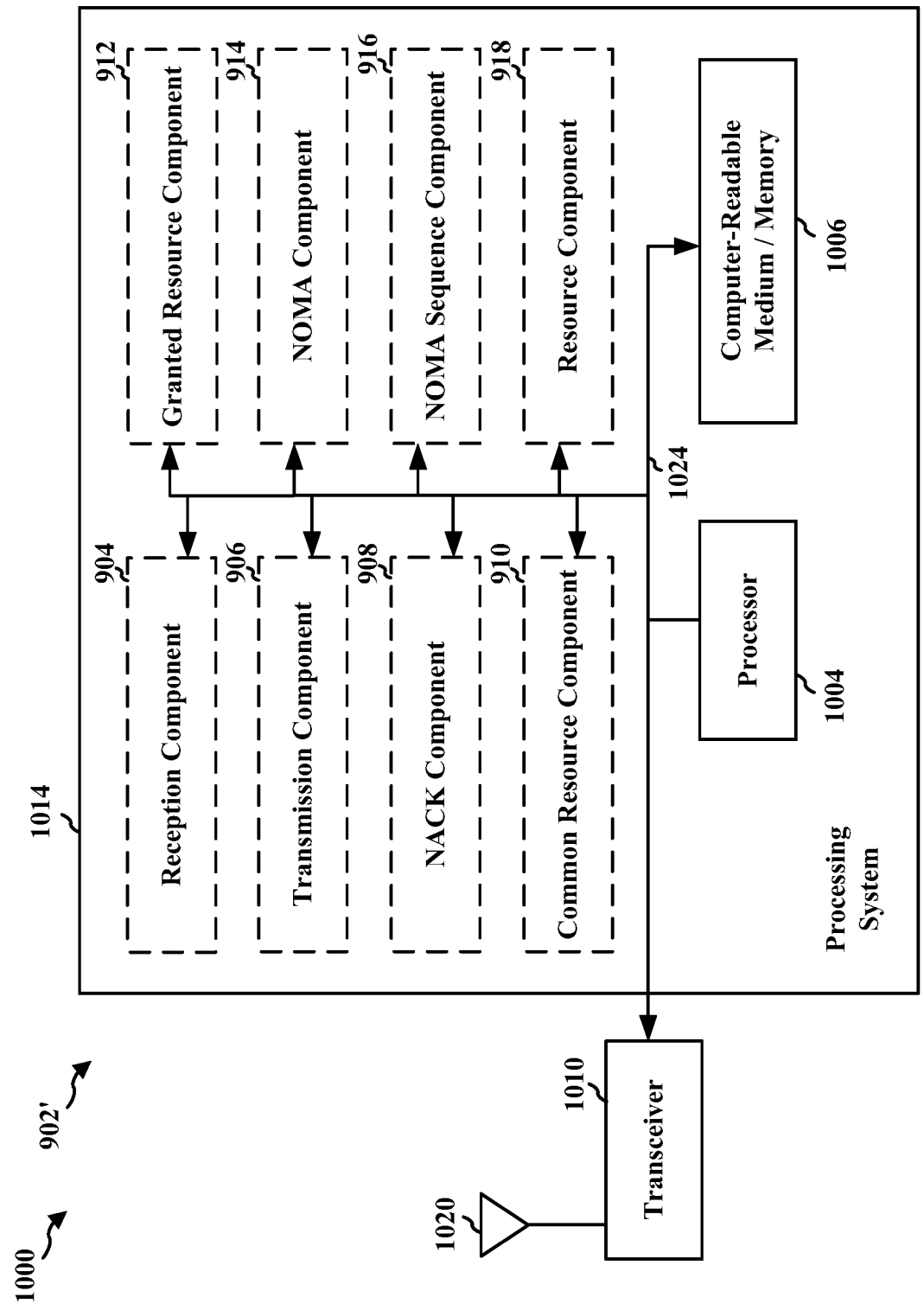
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for attempting to receive a downlink transmission from a base station (e.g., as described in connection with 806 and 904). The apparatus may include means for determining to transmit a negative acknowledgement (NACK) to the base station for the downlink transmission (e.g., as described in connection with 808 and 908). The apparatus may include means for transmitting the NACK to the base station in a common resource in an uplink control channel, wherein the common resource is common to multiple UEs communicating with the base station (e.g., as described in connection with 814 and 910) The apparatus may include means for transmitting the NACK using a resource granted to the UE in the uplink control channel (e.g., as described in connection with 810 and 912). The apparatus may include means for applying a NOMA sequence to the NACK prior to transmission in the common resource (e.g., as described in connection with 812 and 914). The apparatus may include means for receiving an indication from the base station assigning the NOMA sequence to the UE (e.g., as described in connection with 804 and 916). The apparatus may include means for receiving an indication of the common resource from the base station prior to transmitting the NACK (e.g., as described in connection with 802 and 916). The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means. Alternatively, the processing system 1014 may be the entire UE (e.g., see 350 of FIG. 3).

Figure 11:
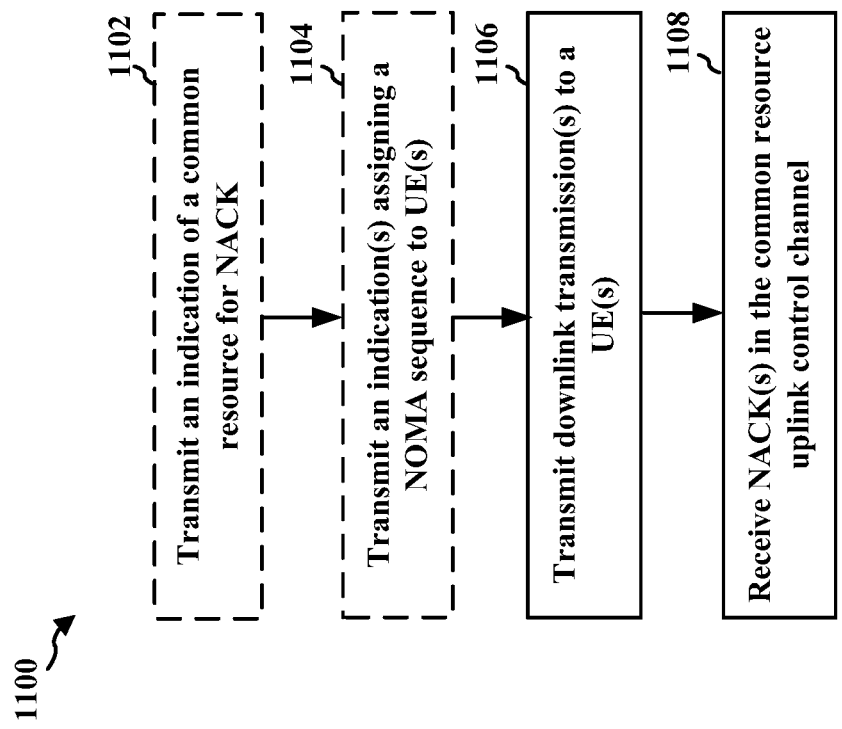
FIG. 11 is a flowchart of a method of wireless communication.

FIG. 11 is a flowchart 1100 of a method of wireless communication. The method may be performed by a base station (e.g., base station 102, 180, 310, 402, 504, 605, 950, the apparatus 1202, 1202'; the processing system 1314, which may include the memory 376 and which may be the entire base station 310 or a component of the base station 310, such as the TX processor 316, the RX processor 370, and/or the controller/processor 375) configured for communication with a UE 1250 (e.g., UE 104, 350, 404, 502, 506, 602, 606, 1250, the apparatus 902, 902'). The communication may comprise TDD communication, e.g., URLLC communication. Optional aspects are illustrated with a dashed line. Aspects of the method may improve decoding of HARQ NACK. Thus, aspects of the method may help data to be retransmitted in a more timely manner or help to avoid wasting resources by reducing unnecessary retransmission of data packets that have been decoded correctly.

At 1106, the base station transmits a downlink transmission to a UE. The transmission may be performed by downlink component 1208 and/or transmission component 1206 of apparatus 1202. The downlink transmission may comprise a data transmission, e.g., PDSCH. FIG. 7 illustrates an example of PDSCH scheduled for UEs.

At 1108, the base station receives a NACK from the UE in a common resource in an uplink control channel. The reception may be performed by NACK component and/or reception component 1204 of apparatus 1202. The common resource is common to multiple UEs communicating with the base station. The common resource may comprise a NOMA resource. Thus, the NACK received at 1108 may comprise a NOMA sequence applied to the NACK prior to transmission in the common resource, wherein the NOMA sequence applied to the NACK identifies the UE. The NOMA sequence may comprise a scrambling sequence and/or a hopping sequence.

The NOMA sequence may be assigned to the UE by the base station. Thus, at 1104, the base station may transmit an indication to the UE assigning the NOMA sequence to the UE. The NOMA sequence may be assigned, or the indication may be provided, by NOMA component 1214 and/or transmission component 1206. As the base station may be communicating with multiple UEs, at 1104, the base station may transmit a plurality of indications to a plurality of UEs, each indication assigning a different NOMA sequence to one of the plurality of UEs.

The indication transmitted at 1104 may comprise a dynamic indication that assigns the NOMA sequence to the UE for a period of time. The period of time may correspond to a duration of a slot in which the indication is transmitted. Thus, the base station may assign NOMA sequences to whichever UEs are scheduled for PDSCH in the corresponding slot. The NOMA sequence might be assigned to the UE for the slot and may be reused/reassigned to a different UE scheduled for PDSCH in a different slot.

As illustrated at 1102, the base station may transmit an indication of the common resource to the UE prior to receiving the NACK. The indication may be provided by common resource component 1212 of apparatus 1202. The indication may be comprised in a RRC message from the base station.

The common resource in which the NACK is received at 1108 may comprises a NOMA resource dedicated for NACKs from the multiple UEs in communication with the base station. Thus, at 1108, the base station may receive a plurality of NACKs from different UEs, and each may use a NOMA sequence that identifies the UE sending the NACK.

Figure 12:
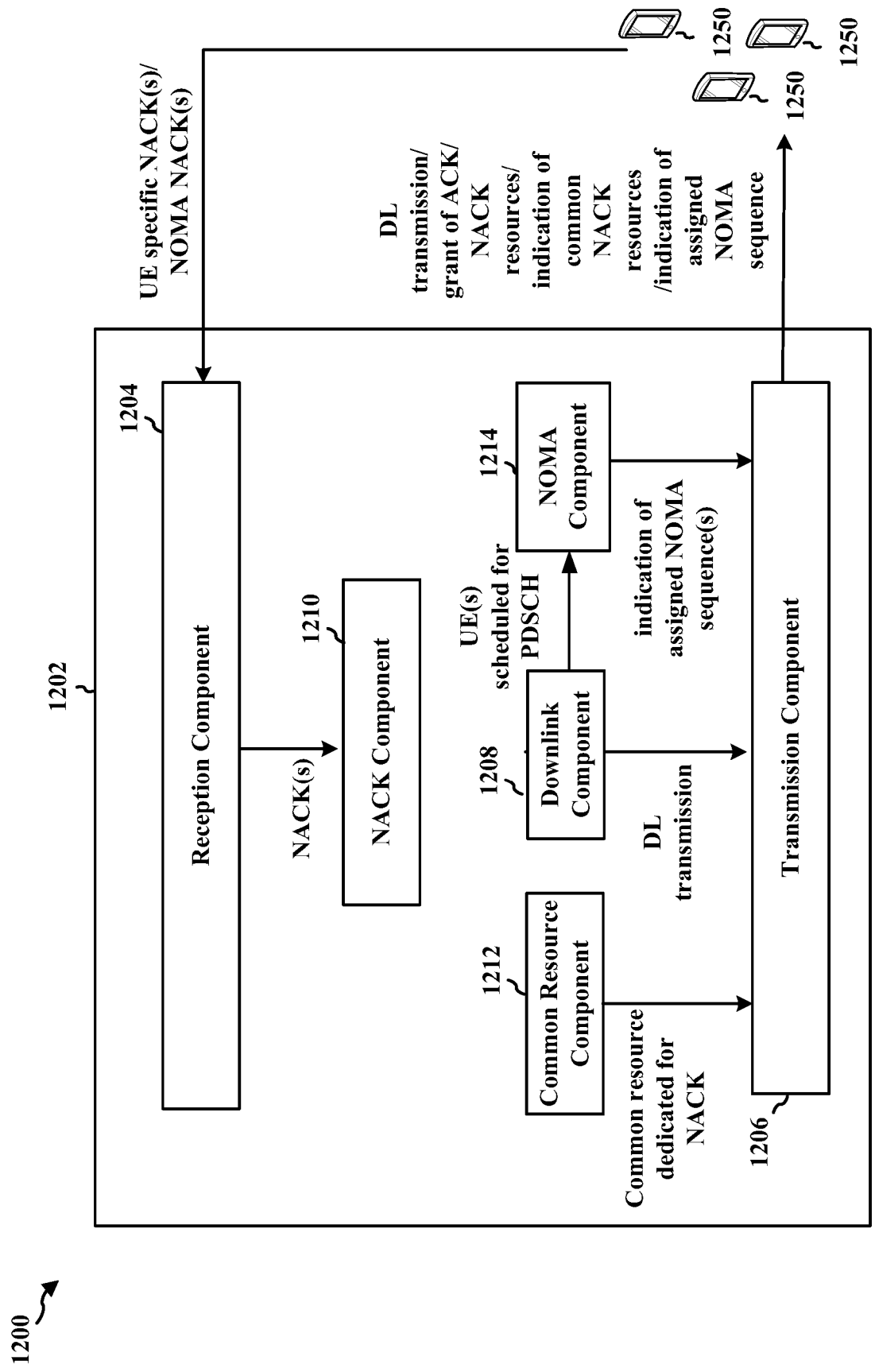
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station (e.g., base station 102, 180, 310, 402, 504, 604, 950) configured for communication with a UE 1250 (e.g., UE 104, 350, 404, 502, 506, 602, 606, the apparatus 902, 902'). The communication may comprise TDD communication, e.g., URLLC communication. The apparatus includes a reception component 1204 that receives uplink communication from the UE, including ACK/NACKs, a transmission component 1206 that transmits downlink communication to UE.

The apparatus includes a downlink component 1208 configured to transmit a downlink communication, e.g., PDSCH to the UE (e.g., as described in connection with 1106 in FIG. 11). The apparatus includes a NACK component 1210 that receives a NACK from the UE in a common resource in an uplink control channel, wherein the common resource is common to multiple UEs communicating with the base station (e.g., as described in connection with 1108 in FIG. 11). The apparatus may include a common resource component 1212 that transmits an indication of the common resource to the UE prior to receiving the NACK (e.g., as described in connection with 1102 in FIG. 11). The apparatus may also include a NOMA component 1214 that transmits an indication to the UE(s) assigning the NOMA sequence(s) to the UE(s) (e.g., as described in connection with 1104 in FIG. 11).

The apparatus may include additional components that perform each of the blocks of the base station algorithm in the aforementioned flowcharts of FIGS. 5, 6, and 11. As such, each block performed by the base station in the aforementioned flowcharts of FIGS. 5, 6, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
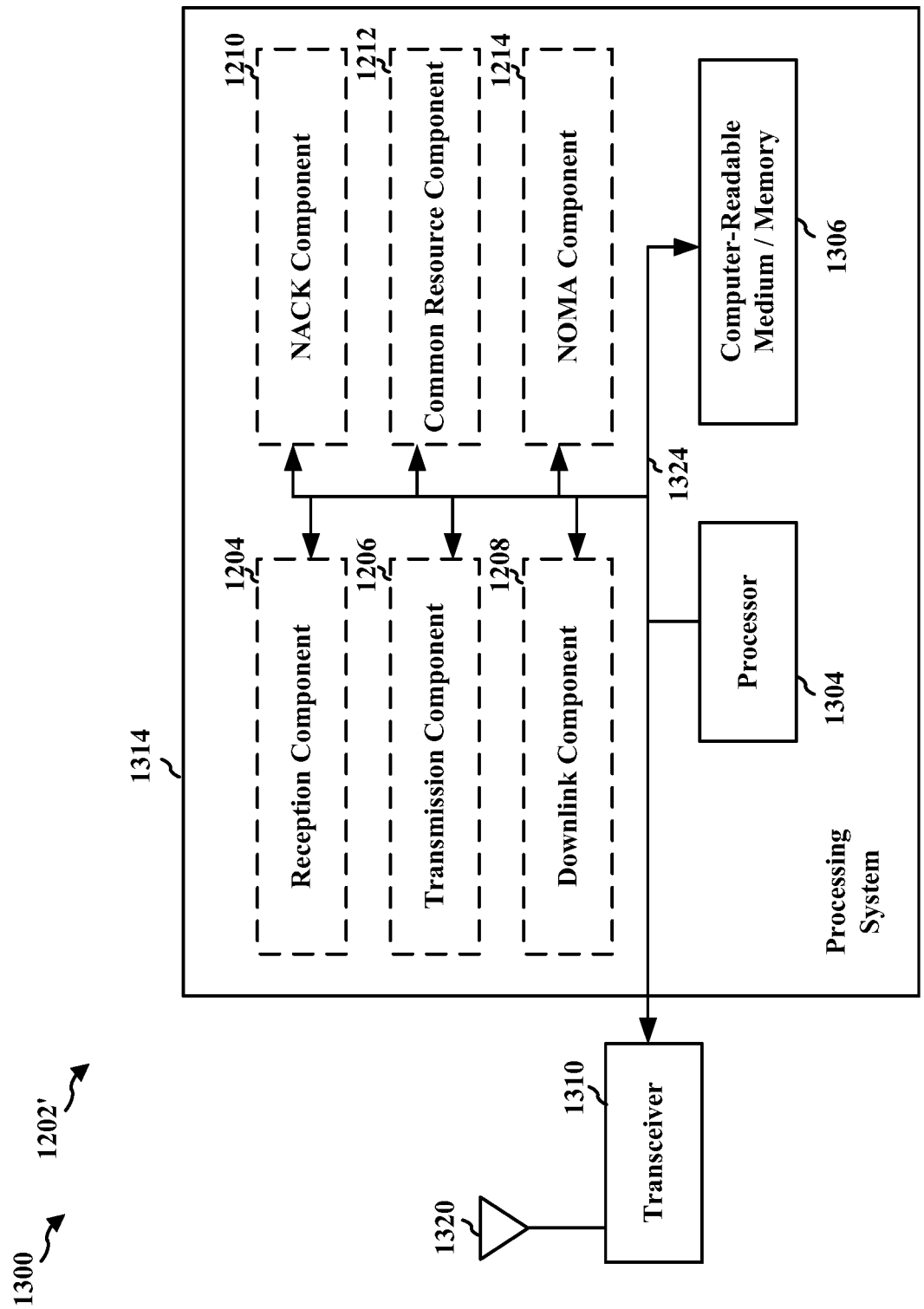
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting a downlink transmission to a user equipment (e.g., as described in connection with 1106 and 1208). The apparatus may include means for receiving a NACK from the UE in a common resource in an uplink control channel (e.g., as described in connection with 1108 and 1210), wherein the common resource is common to multiple UEs communicating with the base station. The apparatus may include means for transmitting an indication to the UE assigning the NOMA sequence to the UE (e.g., as described in connection with 1104 and 1214). The apparatus may include means for transmitting an indication of the common resource to the UE prior to receiving the NACK (e.g., as described in connection with 1102 and 1212). The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. Alternatively, the processing system 1314 may be the entire base station (e.g., see 350 of FIG. 3).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   detecting a decoding failure in a downlink transmission from a base station;
   determining to transmit a negative acknowledgement (NACK) to the base station for the downlink transmission;
   transmitting a first NACK for the downlink transmission using a UE-specific resource granted to the UE in an uplink control channel;
   and
   transmitting a second NACK for the downlink transmission to the base station in a common resource in the uplink control channel, wherein the common resource is designated for NACKs from multiple UEs communicating with the base station and the second NACK transmitted in the common resource comprises a repetition of the first NACK transmitted using the resource granted to the UE.

2. The method of claim 1, wherein the common resource comprises a non-orthogonal multiple access resource.

3. The method of claim 1, further comprising:
   applying a non-orthogonal multiple access (NOMA) sequence to the second NACK prior to transmission in the common resource,
   wherein the NOMA sequence applied to the second NACK identifies the UE.

4. The method of claim 3, wherein the NOMA sequence comprises at least one of a scrambling sequence and a hopping sequence.

5. The method of claim 3, further comprising:
   receiving an indication from the base station assigning the NOMA sequence to the UE.

6. The method of claim 5, wherein the indication comprises a dynamic indication that assigns the NOMA sequence to the UE for a period of time.

7. The method of claim 6, wherein the period of time corresponds to a duration of a slot in which the indication is received.

8. The method of claim 1, further comprising:
   receiving an indication of the common resource from the base station prior to transmitting the second NACK.

9. The method of claim 8, wherein the indication is received via a Radio Resource Control (RRC) message from the base station.

10. The method of claim 1, wherein the common resource comprises a non-orthogonal multiple access resource dedicated for NACKs from the multiple UEs in communication with the base station.

11. An apparatus for wireless communication at a User Equipment (UE), comprising:
    a memory; and
    at least one processor coupled to the memory and configured to:
       detect a decoding failure in a downlink transmission from a base station;
       determine to transmit a negative acknowledgement (NACK) to the base station for the downlink transmission;
       transmit a first NACK for the downlink transmission using a UE-specific resource granted to the UE in the uplink control channel;
       and
       transmit a second NACK for the downlink transmission to the base station in a common resource in an uplink control channel, wherein the common resource is designated for NACKs from multiple UEs communicating with the base station and the second NACK transmitted in the common resource comprises a repetition of the first NACK transmitted using the resource granted to the UE.

12. The apparatus of claim 11, wherein the at least one processor is further configured to:
    apply a non-orthogonal multiple access (NOMA) sequence to the second NACK prior to transmission in the common resource,
    wherein the NOMA sequence applied to the second NACK identifies the UE.

13. The apparatus of claim 12, wherein the at least one processor is further configured to:
    receive an indication from the base station assigning the NOMA sequence to the UE.

14. The apparatus of claim 11, wherein the at least one processor is further configured to:
    receive an indication of the common resource from the base station prior to transmitting the second NACK.

15. A method of wireless communication at a base station, comprising:
    transmitting a downlink transmission to a user equipment (UE);
    receiving a first negative acknowledge (NACK) from the UE via a UE-specific resource granted by the base station to the UE in an uplink control channel, the first NACK indicating a decoding failure in the downlink transmission at the UE; and
    receiving a second NACK from the UE in a common resource in the uplink control channel, wherein the common resource is designated for NACKs from multiple UEs communicating with the base station and the second NACK received in the common resource comprises a repetition of the first NACK received via the resource granted by the base station to the UE.

16. The method of claim 15, wherein the common resource comprises a non-orthogonal multiple access resource.

17. The method of claim 15, wherein the second NACK comprises a non-orthogonal multiple access (NOMA) sequence applied to the second NACK prior to transmission in the common resource,
    wherein the NOMA sequence applied to the NACK identifies the UE.

18. The method of claim 17, wherein the NOMA sequence comprises at least one of a scrambling sequence and a hopping sequence.

19. The method of claim 15, further comprising:
transmitting an indication to the UE assigning the NOMA sequence to the UE.

20. The method of claim 19, further comprising:
transmitting a plurality of indications to a plurality of UEs, each of the plurality of indications assigning a different NOMA sequence to one of the plurality of UEs.

21. The method of claim 19, wherein the indication comprises a dynamic indication that assigns the NOMA sequence to the UE for a period of time.

22. The method of claim 21, wherein the period of time corresponds to a duration of a slot in which the indication is transmitted.

23. The method of claim 15, further comprising:
transmitting an indication of the common resource to the UE prior to receiving the second NACK.

24. The method of claim 23, wherein the indication is comprised in a Radio Resource Control (RRC) message from the base station.

25. The method of claim 15, wherein the common resource comprises a non-orthogonal multiple access resource dedicated for NACKs from the multiple UEs in communication with the base station.

26. An apparatus for wireless communication at a base station, comprising:
a memory; and
at least one processor coupled to the memory and configured to:
transmit a downlink transmission to a user equipment (UE);
receive a first negative acknowledge (NACK) from the UE via a UE-specific resource granted by the base station to the UE in an uplink control channel, the first NACK indicating a decoding failure in the downlink transmission at the UE; and
receive a second NACK from the UE in a common resource in the uplink control channel, wherein the common resource is designated for NACKs from multiple UEs communicating with the base station and the second NACK received in the common resource comprises a repetition of the first NACK received via the resource granted by the base station to the UE.

27. The apparatus of claim 26, wherein the at least one processor is further configured to:
transmit an indication to the UE assigning a non-orthogonal multiple access (NOMA) sequence to the UE.

28. The apparatus of claim 27, wherein the at least one processor is further configured to:
transmit a plurality of indications to a plurality of UEs, each of the plurality of indications assigning a different NOMA sequence to one of the plurality of UEs.

* * * * *